Patented Nov. 25, 1952

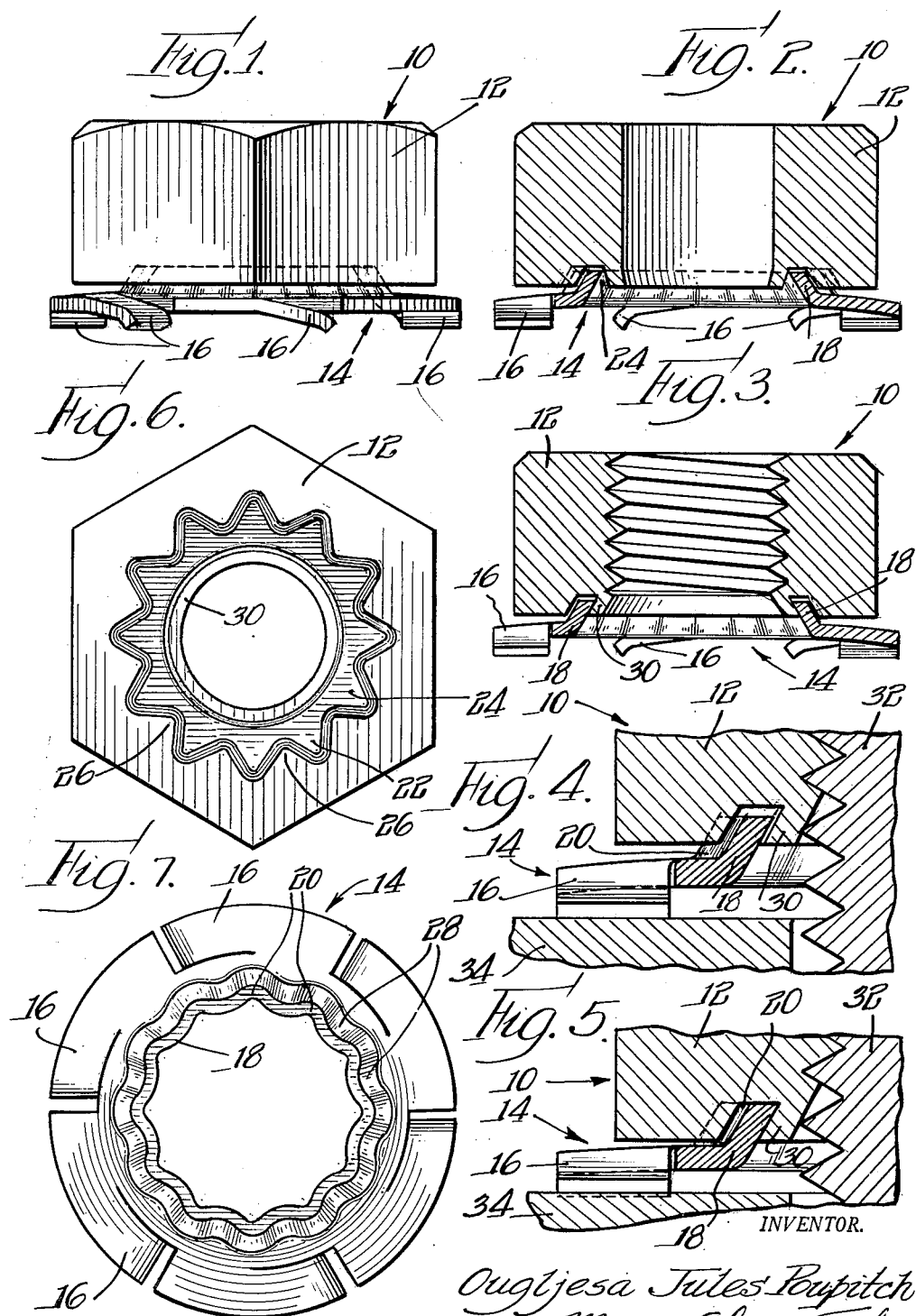

2,619,146

UNITED STATES PATENT OFFICE 2,619,146

NONROTATIVELY COUPLED NUT AND LOCK WASHER

Ougljesa Jules Poupitch, Chicago, Ill., assignor to Illinois Tool Works, Chicago, Ill., a corporation of Illinois Application July 22, 1949, Serial No. 106,257

2 Claims. (Cl. 151—37)

The present invention relates to non-rotatively coupled nut and lock washer and more particularly to pre-assembled nuts and lock washers.

The present invention is concerned primarily with the provision of a new and simple fastener unit in which the washer element thereof is secured against relative rotation with respect to the rotary threaded clamping member with which it is pre-assembled. To this end, the invention contemplates a fastener unit in which the washer element thereof is provided with an inner laterally displaced annular body fitting in an annular groove on the clamping side of the threaded fastener, said body and the wall structure of the groove being designed to interlock with each other so as to secure the parts against relative rotation.

It is a further object of the present invention to provide a fastener unit as set forth above wherein the simple expedient of an outwardly swaged projection on the rotary threaded clamping member in the vicinity of the clamping face thereof cooperates with a complementary inwardly projecting portion of the washer body to secure the parts against axial separation.

The foregoing and other objects and advantages will be more apparent from the following detailed description when considered in connection with the accompanying drawing wherein:

Fig. 1 is a side elevational view of a fastener unit which is representative of one embodiment of the present invention;

Fig. 2 is a centrally vertical sectional view of the fastener unit disclosed in Fig. 1 prior to the radial shifting or displacement of the wall section which forms a retainer for the lock washer and prior to tapping the nut aperture;

Fig. 3 is a sectional view similar to Fig. 2 after the body of the nut has been swaged radially outwardly to provide the retaining shoulder for the washer and after the nut aperture has been tapped;

Fig. 4 is an enlarged fragmentary sectional view of the lower right end portion of the device as shown in Fig. 3 just prior to the tightening of the fastener unit against a work surface;

Fig. 5 is a view similar to Fig. 4 showing the fastener unit clamped against the work surface;

Fig. 6 is a view of the under side of the nut with the lock washer removed; and

Fig. 7 is a plan view of the lock washer detached from the nut.

Referring now to the drawing more in detail wherein like numerals have been employed throughout the various figures to designate similar parts, it will be seen that a fastener unit representing one embodiment of the invention is designated generally by the numeral 10. This fastener unit includes a nut 12 and a sheet metal lock washer designated generally by the numeral 14. The lock washer 14 includes a plurality of resilient prongs 16 carried along the margin of an annular body 18.

The body portion 18 includes a conoidal or frusto-conical attachment part which is undulated corrugated so as to provide projections 20 adapted to interlock with complementary recesses 22, which form portions of an annular groove 24 provided at the clamping side of the nut 12. Projections 26 in the nut 12 are designed to interlock with complementary recesses 28 in the washer body 18. Thus when the lock washer and nut are preliminarily assembled as illustrated in Fig. 2, the projecting parts 20 of the undulated body 18 interlock with the complementary recesses 22 of the nut, and the projections 26 of the nut interlock with the recesses 28 of the undulated body to secure the washer and nut against relative rotation.

After the undulated conoidal body of the washer has been thus positioned within the groove 24 of the nut, a suitable tool (not shown) is employed to swage outwardly the section of the nut which defines the inner wall of the groove 24. This presents an annular shoulder 30 which overlaps or underlies the attachment part of the annular washer body 18. Thus the annular outwardly swaged shoulder 30 cooperates with the washer body to secure it against axial separation from the nut, and the interlocking undulations or teeth previously described secure the washer and nut against relative rotation. As the fastener unit 10 is tightened on the complementary screw 32 from the position shown in Fig. 4 to the position shown in Fig. 5, the teeth of the prongs 16, which normally project downwardly beyond the plane co-incident with the prong roots, imbed themselves within the work 34 so as to secure the unit against retrograde loosening rotation with respect to the work.

It will be apparent from the foregoing description that the invention contemplates a fastener unit of extremely simple and economical construction. Various forms of lock washers may be employed in which the locking teeth project below the plane of the prong roots and in which the body of the washer is provided with an attachment portion having corrugations complemental with nut corrugations for securing against rotation with respect to the nut. The washer teeth as disclosed herein may slide along the surface of the work during the initial clamping operation and when finally tightened in position these teeth will imbed themselves sufficiently to prevent unauthorized retrograde rotation of the fastener unit.

While for purpose of illustration certain structural details of the lock washer and groove construction have been disclosed herein, it will be understood that other modifications and changes may be employed without departing from the spirit and scope of the appended claims.

The invention is hereby claimed as follows:

1. In a preassembled nut and washer including a sheet metal washer member having an inner body in the form of an inwardly inclined rigid continuous corrugated conoidal annulus with the free margin thereof providing an annular retaining section, said washer member including a dished section extending outwardly radially a substantial distance from the base of said conoidal annulus and presenting an outer axially deflectable marginal portion positioned axially beyond a plane coincident with the base of said conoidal section for engaging the complementary work surface, a nut member having an annular groove disposed closely adjacent the threaded bore of the nut to leave a substantial clamping surface, and a radially deformable skirt portion disposed radially interiorly of the clamping surface of the nut, said annular groove being defined by wall surfaces extending axially inwardly from said clamping surface and initially in relatively flaring position to provide a wide entrance to the groove for facilitating insertion therein of said retaining section, the wall surface adjacent the outer surface of the conoidal annulus having corrugations, said skirt portion being expanded radially outwardly after said insertion of the retaining section to reduce the width of the entrance to the groove and to approach and underlie the adjacent surface of the retaining section, thereby to prevent axial separation of the nut and washer, corrugations of the outer inclined surface of said rigid conoidal washer body and the corrugations of the adjacent inclined wall surface providing a plurality of complementary interlocking abutments whereby, as an incident to clamping the washer against a complementary work surface, said inclined surfaces are urged toward each other so as materially to increase the interlocking aggressiveness of the complementary abutments and thus ensure against any relative rotation of the washer and nut.

2. A preassembled nut and washer in accordance with claim 2, wherein the outer axially deflectable marginal portion of the washer includes a plurality of circumferentially spaced work engaging teeth all of which are axially deflected in a direction away from the clamping surface of the nut so as to permit tightening rotation of the nut and washer in one direction and agressively resist loosening rotation thereof in the opposite direction.

OUGLJESA JULES POUPITCH.

REFERENCES CITED

The following references are of record in the file of this patent:

UNITED STATES PATENTS

| Number | Name | Date |
| --- | --- | --- |
| 524,864 | Porter | Aug. 21, 1894 |
| 1,228,130 | Price | May 29, 1917 |
| 1,643,384 | Klafke | Sept. 27, 1927 |
| 1,924,695 | Olson | Aug. 29, 1933 |
| 1,956,745 | Payne | May 1, 1934 |
| 2,124,249 | Guiducci | July 19, 1938 |
| 2,226,491 | Gustafson | Dec. 24, 1940 |
| 2,228,284 | Olson | Jan. 14, 1941 |
| 2,297,957 | Hanneman | Oct. 6, 1942 |
| 2,576,906 | Poupitch | Nov. 27, 1951 |